United States Patent
Kamiguchi et al.

(10) Patent No.: US 10,838,394 B2
(45) Date of Patent: *Nov. 17, 2020

(54) FAILURE CLASSIFYING DEVICE, FAILURE CLASSIFYING METHOD, AND FAILURE CLASSIFYING PROGRAM FOR SPECIFYING LOCATIONS OF FAILURES IN A MACHINE

(71) Applicant: FANUC CORPORATION, Yamanashi (JP)

(72) Inventors: Masao Kamiguchi, Yamanashi (JP); Shouichi Kawakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,428

(22) Filed: Jan. 7, 2019

(65) Prior Publication Data

US 2019/0243332 A1  Aug. 8, 2019

(30) Foreign Application Priority Data

Feb. 2, 2018 (JP) .................................. 2018-017014

(51) Int. Cl.
*G05B 19/05* (2006.01)
*G05B 19/4065* (2006.01)
(Continued)

(52) U.S. Cl.
CPC ..... *G05B 19/4065* (2013.01); *G05B 19/4184* (2013.01); *G05B 23/024* (2013.01);
(Continued)

(58) Field of Classification Search
CPC .................................................. G05B 19/058
(Continued)

(56) References Cited

U.S. PATENT DOCUMENTS

| 5,557,549 | A | 9/1996 | Chang |
| 2005/0028045 | A1 | 2/2005 | Kawaike |

(Continued)

FOREIGN PATENT DOCUMENTS

| CN | 105531680 | 4/2016 |
| JP | 5-314182 | 11/1993 |

(Continued)

OTHER PUBLICATIONS

English translation of JP2598693B2, 1989, Google Patents, pp. 6 (Year: 1989).*

(Continued)

*Primary Examiner* — Suresh Suryawanshi
(74) *Attorney, Agent, or Firm* — Wenderoth, Lind & Ponack, L.L.P.

(57) ABSTRACT

Provided are a failure classifying device, a failure classifying method, and a failure classifying program capable of specifying the causes of failures even when a controller does not generate an alarm. A failure classifying device includes: a failure unit acquiring unit that acquires a data set in which a failure unit of a machine is correlated with one or a plurality of constituent parts; a failure history acquiring unit that acquires a failure history including events of failures that occurred in the past and countermeasure parts; and a correlating unit that stores information on one or a plurality of events in correlation with the failure unit by matching the constituent part to the countermeasure part.

6 Claims, 9 Drawing Sheets

(51) Int. Cl.
  *G05B 23/02* (2006.01)
  *G06F 16/35* (2019.01)
  *G05B 19/418* (2006.01)
  *G06F 11/00* (2006.01)

(52) U.S. Cl.
  CPC ....... *G05B 23/027* (2013.01); *G05B 23/0221* (2013.01); *G05B 23/0275* (2013.01); *G06F 11/008* (2013.01); *G06F 16/35* (2019.01); *G05B 2219/37252* (2013.01); *G05B 2219/37616* (2013.01)

(58) Field of Classification Search
  USPC .......................................................... 700/21
  See application file for complete search history.

(56) References Cited

U.S. PATENT DOCUMENTS

| | | | |
|---|---|---|---|
| 2006/0271339 A1* | 11/2006 | Fukada | G05B 23/0213 702/185 |
| 2008/0034258 A1 | 2/2008 | Moriya et al. | |
| 2008/0215292 A1 | 9/2008 | Kato et al. | |
| 2010/0177359 A1* | 7/2010 | Miyazaki | H04N 1/00224 358/406 |
| 2012/0036405 A1* | 2/2012 | Iizuka | G11C 29/56008 714/723 |
| 2014/0214363 A1 | 7/2014 | Hatch et al. | |
| 2017/0075743 A1* | 3/2017 | Zhu | G06F 11/0751 |
| 2017/0269985 A1* | 9/2017 | Xiao | G06F 11/0766 |
| 2018/0137008 A1* | 5/2018 | Maeda | H04L 49/1515 |
| 2018/0137129 A1* | 5/2018 | Matsuo | G06F 16/93 |
| 2018/0137377 A1* | 5/2018 | Nishida | G08G 1/0112 |
| 2018/0275639 A1* | 9/2018 | Shinoda | G05B 19/416 |
| 2019/0108692 A1 | 4/2019 | Du et al. | |
| 2019/0243351 A1* | 8/2019 | Okita | G05B 19/406 |

FOREIGN PATENT DOCUMENTS

| | | |
|---|---|---|
| JP | 2003-271212 | 9/2003 |
| JP | 2007-109056 | 4/2007 |
| JP | 2008-32477 | 2/2008 |
| JP | 2008-90682 | 4/2008 |
| JP | 4112594 | 7/2008 |
| JP | 2015036962 A * | 2/2015 |
| JP | 2016-64474 | 4/2016 |
| WO | 2014/061604 | 4/2014 |
| WO | 2017/175378 | 10/2017 |

OTHER PUBLICATIONS

Kenichi et al, English translation of JP2018190366A, 2018, Japan Platform for Patent Information, pp. 36 (Year: 2018).*
Sato et al, English translation of JPH05150818A, 1991, Google Patents, pp. 7 (Year: 1991).*
Office Action dated Jul. 23, 2020 in U.S. Appl. No. 16/233,430.

* cited by examiner

FIG. 3

| NUMBER | CNC ALARM | FAILURE EVENT | COUNTERMEASURE PART |
|---|---|---|---|
| 1 | NONE | GRINDING SOUND IS GENERATED FROM TABLE | PT002 |
| 2 | NONE | RUMBLING SOUND IS GENERATED WHEN TABLE MOVES | PB003 |
| 3 | NONE | MOVEMENT OF TABLE IS POOR | PT003 |
| 4 | NONE | MACHINING ACCURACY BECAME POOR | PB001 |
| 5 | ALM10 | OVERLOAD ALARM IS GENERATED | PC001 |
| 6 | ALM20 | OVERCURRENT ALARM IS GENERATED | PM001 |
| 7 | NONE | GRINDING SOUND IS GENERATED FROM TABLE | PT002 |
| 8 | NONE | BACKLASH INCREASED AND MACHINING ACCURACY DETERIORATED | PB001 |
| 9 | NONE | RUMBLING SOUND IS GENERATED DURING MACHINING | PB003 |
| 10 | ALM10 | OVERLOAD ALARM IS GENERATED | PC001 |
| 11 | ALM20 | ABNORMAL SOUND IS GENERATED FROM MOTOR AND OVERCURRENT ALARM IS GENERATED | PM001 |
| ... | ... | ... | ... |
| N | NONE | MACHINING ACCURACY DETERIORATED | PB001 |

FIG. 5

| EVENT CODE | EVENT MESSAGE | PART NAME | PART NUMBER |
|---|---|---|---|
| M001 | MOTOR FAILURE MAY BE THE CAUSE. PLEASE CHECK MOTOR. | MOTOR | PM001 |
| | | PULSE CODER | PM002 |
| C001 | JOINT FAILURE MAY BE THE CAUSE. PLEASE CHECK JOINT. | JOINT | PC001 |
| B001 | WEARING OF BALL SCREW MAY BE THE CAUSE. PLEASE CHECK GREASING STATE AND BALL SCREW STATE. | BALL SCREW | PB001 |
| | | BALL NUT | PB002 |
| | | BEARING A | PB003 |
| | | BEARING B | PB004 |
| | | GREASING SITE B | PB005 |
| T001 | WEARING OF LM GUIDE MAY BE THE CAUSE. PLEASE CHECK GREASING STATE AND LM GUIDE STATE. | TABLE | PT001 |
| | | LM GUIDE | PT002 |
| | | GREASING SITE A1 | PT003 |
| | | GREASING SITE A2 | PT004 |

FIG. 6

| NUMBER | EVENT CODE | CNC ALARM | FAILURE EVENT | COUNTERMEASURE PART |
|---|---|---|---|---|
| 1 | T001 | NONE | GRINDING SOUND IS GENERATED FROM TABLE | PT002 |
| 2 | B001 | NONE | RUMBLING SOUND IS GENERATED WHEN TABLE MOVES | PB003 |
| 3 | T001 | NONE | MOVEMENT OF TABLE IS POOR | PT003 |
| 4 | B001 | NONE | MACHINING ACCURACY BECAME POOR | PB001 |
| 5 | C001 | ALM10 | OVERLOAD ALARM IS GENERATED | PC001 |
| 6 | M001 | ALM20 | OVERCURRENT ALARM IS GENERATED | PM001 |
| 7 | T001 | NONE | GRINDING SOUND IS GENERATED FROM TABLE | PT002 |
| 8 | B001 | NONE | BACKLASH INCREASED AND MACHINING ACCURACY DETERIORATED | PB001 |
| 9 | B001 | NONE | RUMBLING SOUND IS GENERATED DURING MACHINING | PB003 |
| 10 | C001 | ALM10 | OVERLOAD ALARM IS GENERATED | PC001 |
| 11 | M001 | ALM20 | ABNORMAL SOUND IS GENERATED FROM MOTOR AND OVERCURRENT ALARM IS GENERATED | PM001 |
| ... | ... | ... | ... | ... |
| N | B001 | NONE | MACHINING ACCURACY DETERIORATED | PB001 |

FIG. 7

| NUMBER | EVENT CODE | CNC ALARM | FAILURE EVENT | COUNTERMEASURE PART |
|---|---|---|---|---|
| 1 | T001 | NONE | GRINDING SOUND IS GENERATED FROM TABLE | PT002 |
| 2 | T001 | NONE | MOVEMENT OF TABLE IS POOR | PT003 |
| 3 | T001 | NONE | GRINDING SOUND IS GENERATED FROM TABLE | PT002 |
| 4 | B001 | NONE | MACHINING ACCURACY BECAME POOR | PB001 |
| 5 | B001 | NONE | RUMBLING SOUND IS GENERATED WHEN TABLE MOVES | PB003 |
| 6 | B001 | NONE | BACKLASH INCREASED AND MACHINING ACCURACY DETERIORATED | PB001 |
| 7 | B001 | NONE | RUMBLING SOUND IS GENERATED DURING MACHINING | PB003 |
| 8 | B001 | NONE | MACHINING ACCURACY DETERIORATED | PB001 |
| 9 | C001 | ALM10 | OVERLOAD ALARM IS GENERATED | PC001 |
| 10 | C001 | ALM10 | OVERLOAD ALARM IS GENERATED | PC001 |
| 11 | M001 | ALM20 | ABNORMAL SOUND IS GENERATED FROM MOTOR AND OVERCURRENT ALARM IS GENERATED | PM001 |
| 12 | M001 | ALM20 | OVERCURRENT ALARM IS GENERATED | PM001 |
| ... | ... | ... | ... | ... |

FIG. 8

| NUMBER | EVENT CODE | CNC ALARM | FEATURE | COUNTERMEASURE PART |
|---|---|---|---|---|
| 1 | T001 | NONE | TABLE (3), GRINDING SOUND (2), MOVEMENT IS POOR (1) | PT002(2), PT003 |
| 2 | B001 | NONE | MACHINING ACCURACY (3), RUMBLING SOUND (2), BACKLASH (1) | PB001(3), PB003(2) |
| 3 | C001 | ALM10 | OVERLOAD ALARM (2) | PC001(2) |
| 4 | M001 | ALM20 | ABNORMAL SOUND FROM MOTOR (1), OVERCURRENT ALARM (2) | PM001(2) |

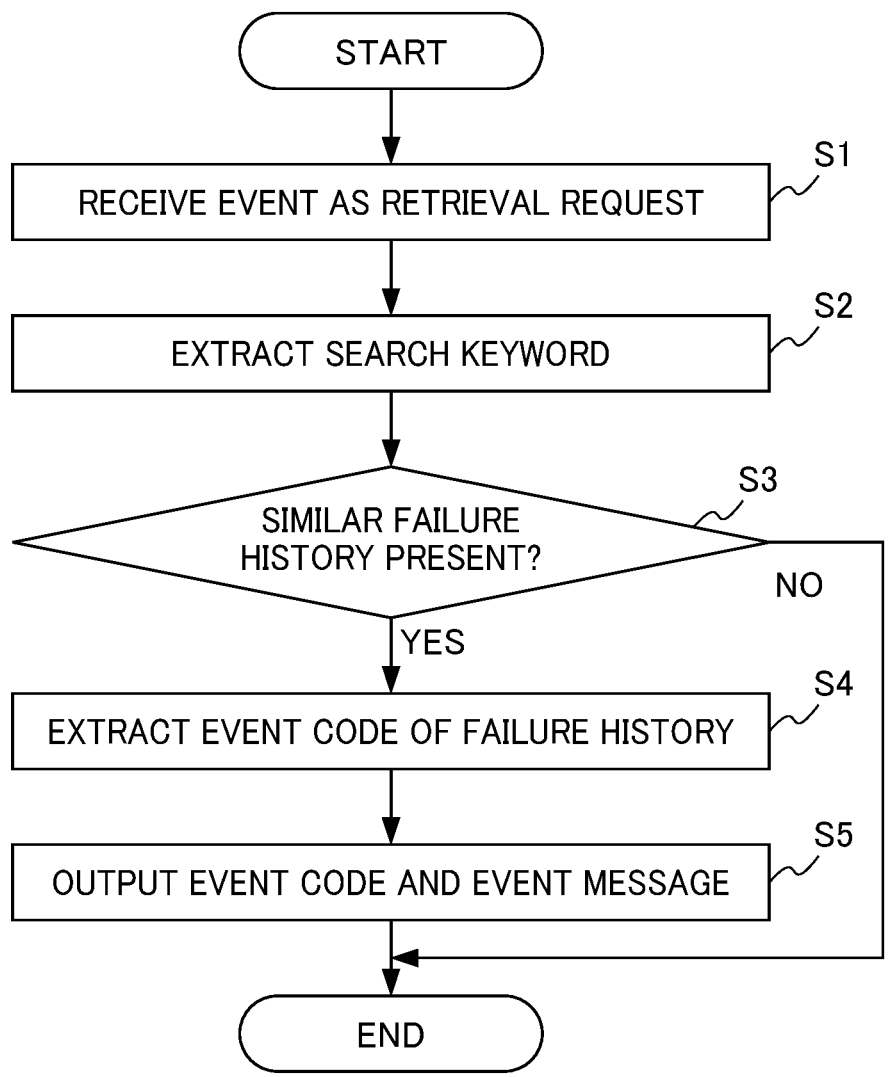

FAILURE CLASSIFYING DEVICE, FAILURE CLASSIFYING METHOD, AND FAILURE CLASSIFYING PROGRAM FOR SPECIFYING LOCATIONS OF FAILURES IN A MACHINE

This application is based on and claims the benefit of priority from Japanese Patent Application No. 2018-017014, filed on 2 Feb. 2018, the content of which is incorporated herein by reference.

BACKGROUND OF THE INVENTION

Field of the Invention

The present invention relates to a failure classifying device, a failure classifying method, and a failure classifying program for specifying the locations of failures in a machine.

Related Art

Conventionally, when a failure occurs in a machine such as a machine tool, a robot, or an injector molding machine, a controller (for example, a computerized numerical controller (CNC)) that controls the machine detects errors inside the controller or detects problems that occur in a mechanism unit of the machine on the basis of an overload or the like of a motor and outputs an alarm. This alarm information is useful in tracking failures and performs a role of clustering many causes of failures that occur.

In order to solve a failure occurring presently, information may be acquired from a past failure report stored in advance by keyword-based retrieval. For example, Patent Document 1 discloses a method of displaying candidates for refined keywords in descending order of cumulative numbers of keywords present in a group of documents as a guidance in order to guide refining of retrieval in a desirable direction as a keyword-based retrieval method.

Patent Document 1: Japanese Unexamined Patent Application, Publication No. H05-314182

SUMMARY OF THE INVENTION

However, a controller may not detect some failures of a machine and may not generate an alarm. In this case, there are a number of locations which are regarded as the cause of a failure, and it may take a considerable amount of time to track down the failure. Even when an event is retrieved from a past failure report, it is difficult to specify a failure location from many portions of the mechanism unit of a machine.

An object of the present invention is to provide a failure classifying device, a failure classifying method, and a failure classifying program capable of specifying the causes of failures even when a controller does not generate an alarm.

(1) A failure classifying device (for example, a failure classifying device 1 to be described later) according to the present invention includes: a failure unit acquiring unit (for example, a failure unit acquiring unit 12 to be described later) that acquires a data set in which a failure unit of a machine is correlated with one or a plurality of constituent parts; a failure history acquiring unit (for example, a failure history acquiring unit 11 to be described later) that acquires a failure history including events of failures that occurred in the past and countermeasure parts; and a correlating unit (for example, a correlating unit 13 to be described later) that stores information on one or a plurality of events in correlation with the failure unit by matching the constituent part to the countermeasure part.

(2) The failure classifying device according to (1) may further include a feature extracting unit (for example, a feature extracting unit 14 to be described later) that extracts a failure keyword included in the information on the event as feature data of each of the failure units correlated by the correlating unit, and the correlating unit may store one or a plurality of pieces of the feature data in correlation with the failure unit.

(3) The failure classifying device according to (1) or may further include: a retrieval receiving unit (for example, a retrieval receiving unit 15 to be described later) that receives a retrieval request including a search keyword; and a retrieval execution unit (for example, a retrieval execution unit 16 to be described later) that retrieves information on the event on the basis of the search keyword and outputs the failure unit correlated with the information on the event.

(4) In the failure classifying device according to (3), the retrieval receiving unit may extract feature data included in the retrieval request as the search keyword.

(5) A failure classifying method according to the present invention causes a computer (for example, a failure classifying device 1 to be described later) to execute: a failure unit acquiring step of acquiring a data set in which a failure unit of a machine is correlated with one or a plurality of constituent parts; a failure history acquiring step of acquiring a failure history including events of failures that occurred in the past and countermeasure parts; and a correlating step of storing information on one or a plurality of events in correlation with the failure unit by matching the constituent part to the countermeasure part.

(6) A failure classifying program according to the present invention causes a computer (for example, a failure classifying device 1 to be described later) to execute: a failure unit acquiring step of acquiring a data set in which a failure unit of a machine is correlated with one or a plurality of constituent parts; a failure history acquiring step of acquiring a failure history including events of failures that occurred in the past and countermeasure parts; and a correlating step of storing information on one or a plurality of events in correlation with the failure unit by matching the constituent part to the countermeasure part.

According to the present invention, it is possible to specify the causes of failures even when a controller does not generate an alarm.

BRIEF DESCRIPTION OF THE DRAWINGS

FIG. 3 is a diagram illustrating as example of failure history data according to an embodiment.

FIG. 5 is a diagram illustrating an example of a data set that defines a failure unit according to an embodiment.

FIG. 6 is a diagram illustrating an example of a failure history database to which an event code according to an embodiment is appended.

FIG. 7 illustrates an example in which a failure history database according to an embodiment is sorted by an event code.

FIG. 8 is a diagram illustrating an example of a failure history database based on feature data according to an embodiment.

FIG. 9 is a flowchart illustrating a retrieval process example of a failure classifying device according to an embodiment.

DETAILED DESCRIPTION OF THE INVENTION

Figure 1:
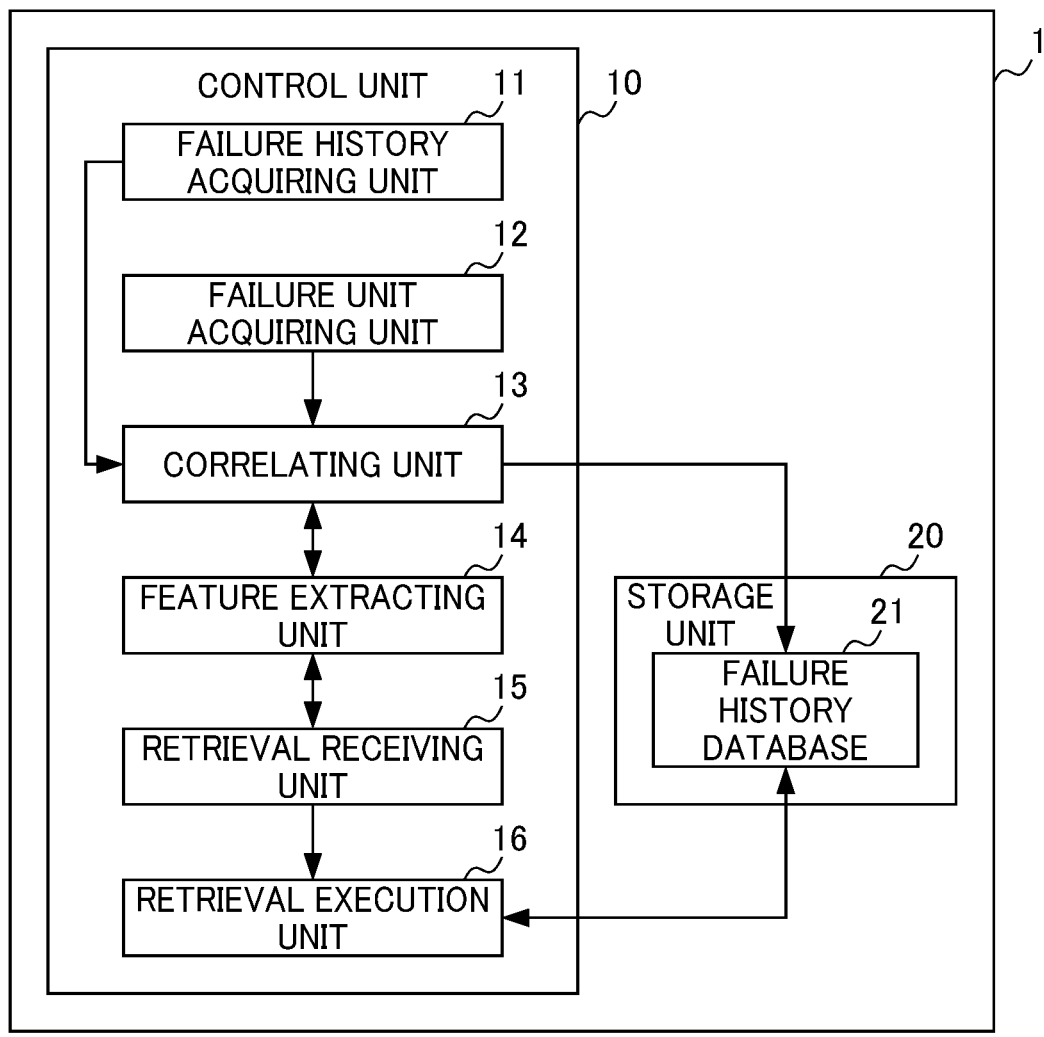
FIG. 1 is a block diagram illustrating a functional configuration of a failure classifying device according to an embodiment.

Hereinafter, an example of an embodiment of the present invention will be described. FIG. 1 is a block diagram illustrating a functional configuration of a failure classifying device 1 according to the present embodiment.

The failure classifying device 1 is an information processing device (computer) such as a server device or a PC and includes a control unit 10 and a storage unit 20. The failure classifying device 1 further includes various data input/output devices, a communication device, and the like, and searches a database of the storage unit 20 on the basis of the input of search keywords from a user to output a retrieval result.

The control unit 10 is a part that controls the entire failure classifying device 1 and realizes various functions of the present embodiment by reading and executing various programs stored in the storage unit 20 appropriately. The control unit 10 may be a CPU.

The storage unit 20 is a storage area for various programs for causing a hardware group to function as the failure classifying device and various pieces of data and may be a ROM, a RAM, a flash memory, or a hard disk drive (HDD). Specifically, the storage unit 20 stores a failure history database 21 and the like constructed as a retrieval target in addition to a failure classifying program for causing the control unit 10 to execute various functions of the present embodiment. The failure history database 21 is provided outside the failure classifying device 1 and may read and write data by communicating with the failure classifying device 1.

The control unit 10 includes a failure history acquiring unit 11, a failure unit acquiring unit 12, a correlating unit 13, a feature extracting unit 14, a retrieval receiving unit 15, and a retrieval execution unit 16. The control unit 10 classifies failures on the basis of event information of a machine with the aid of these functional units.

Figure 2:
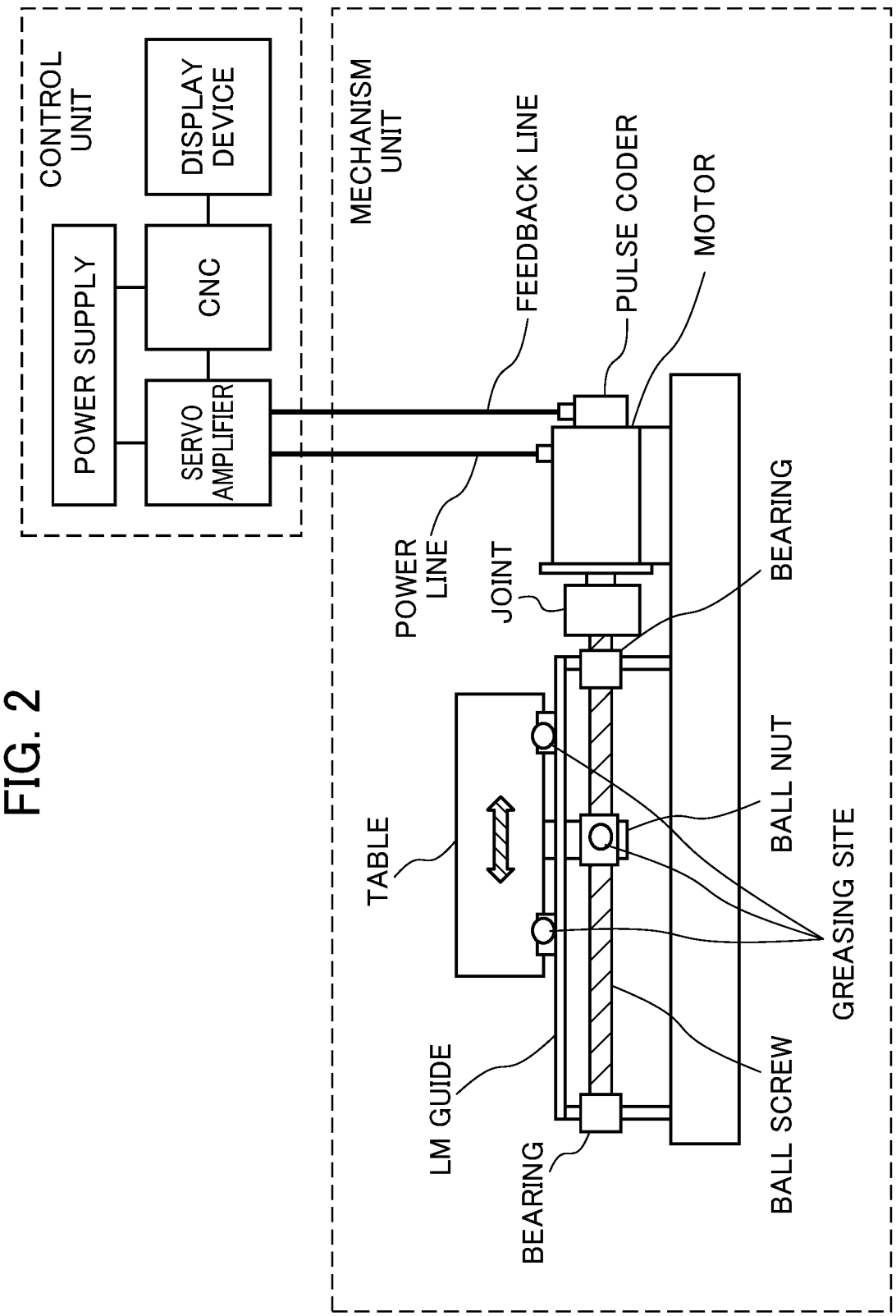
FIG. 2 is a diagram illustrating a configuration example of a machine which is a subject of a failure classifying method according to an embodiment.

FIG. 2 is a diagram illustrating a configuration example of a machine which is a subject of a failure classifying method according to the present embodiment. A machine is classified into a control unit and a mechanism unit, and the control unit displays an alarm number and the content of an alarm detected by a controller (CNC) on a display device to inform an operator of a situation. Moreover, as for failures that occur in the mechanism unit, a controller monitors a situation of a motor of the mechanism unit driven by a servo amplifier and outputs an overcurrent alarm, an overload alarm, or the like for the motor.

However, although an alarm may be output for failures which cause a serious problem in operations of a machine, since dynamic power is transmitted indirectly from the motor to respective portions of the mechanism unit, it may often be difficult to detect failures that occur in the mechanism unit on the basis of a feedback from the motor. In this case, an operator finds out vibration, abnormal noise, and the like generated in the mechanism unit and searches for failure locations by checking respective elements of the machine one by one.

The failure history acquiring unit 11 acquires a failure history including various failure events that have occurred in the machine in the past and countermeasure parts.

FIG. 3 is a diagram illustrating an example of failure history data according to the present embodiment. In the failure history data, for example, a description "grinding sound is generated from the vicinity of a table" describing the event of a failure that occurred in the past is correlated with the number of a countermeasure part for eliminating the failure. In this example, an alarm number is recorded when the controller (CNC) outputs an alarm with respect to the occurred failure.

The failure unit acquiring unit 12 acquires a data set in which a failure unit of a machine is correlated with one or a plurality of constituent parts. A failure unit is a unit in which a failure occurring in the mechanism unit of a machine is examined and countermeasures thereof are taken, and a plurality of failure units made up of one or a plurality of constituent parts of which the causes of a failure cannot be separated is set when a machine is designed.

Figure 4:
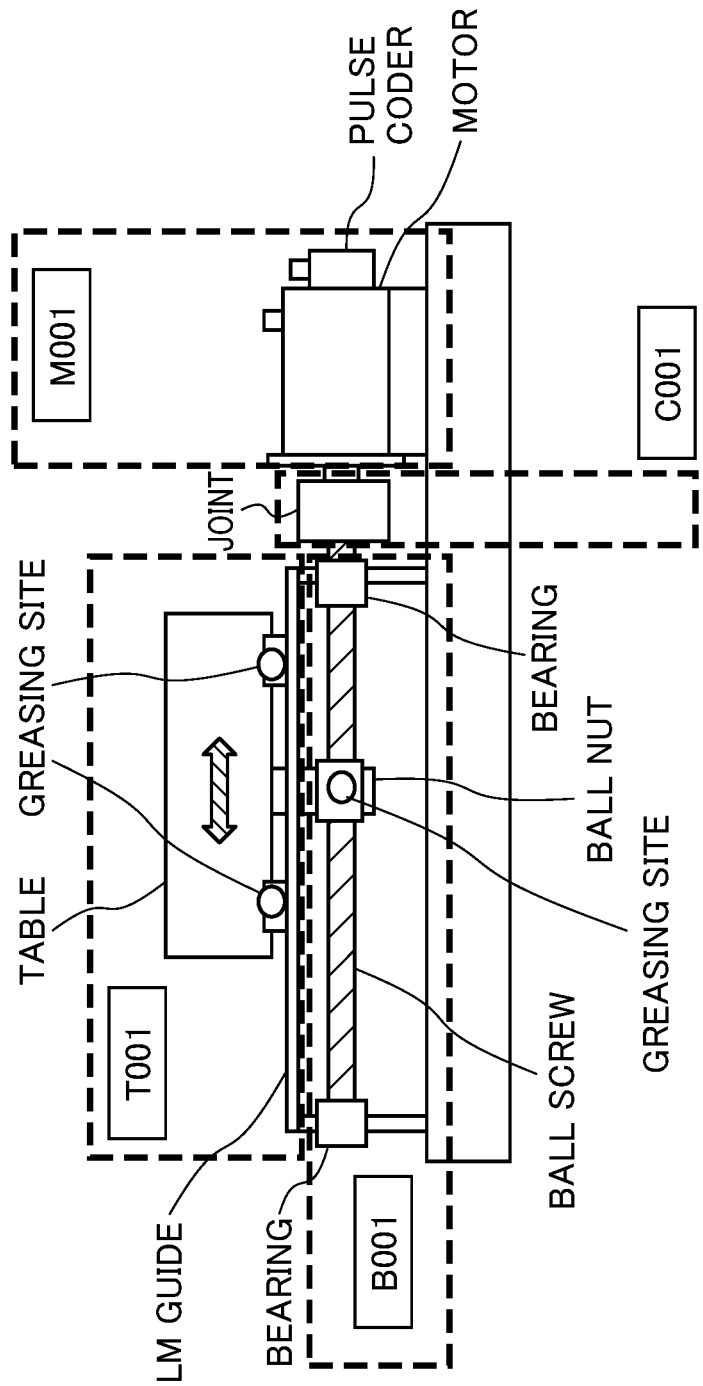
FIG. 4 is a diagram illustrating a definition example of a failure unit according to an embodiment.

FIG. 4 is a diagram illustrating a definition example of a failure unit according to the present embodiment. For example, a mechanism unit of a machine tool is divided into the following failure units.

M001: location including a motor that drives a machine tool, a pulse coder that gives feedback on a rotating position of the motor, and the like.

C001: location including a joint or the like which is a connection portion for transmitting dynamic power from a motor to a ball screw or the like.

B001: location including greasing spots to which grease is supplied automatically or manually, or the like in addition to a ball screw, a ball nut, and a bearing driven by a motor via a joint in order to align a table.

T001: location including greasing spots to which grease is supplied automatically or manually, or the like in addition to a table and a linear motion guide (LM: guide).

FIG. 5 is a diagram illustrating an example of a data set that defines a failure unit according to the present embodiment. In a data set, a part number and a part name that form a failure unit are registered with respect to an event code which is an identifier indicating the failure unit. In this example, an event message for notifying of the causes of a failure, a countermeasure procedure, and the like is registered for each event code.

The correlating unit 13 matches a constituent part correlated with an event code with a countermeasure part of a failure history and stores information on one or a plurality of events in the failure history database 21 of the storage unit 20 in correlation with the event code (the failure unit).

FIG. 6 is a diagram illustrating an example of a failure history database 21 to which an event code according to the present embodiment is appended. In this example, an event code is appended to each piece of failure history data illustrated in FIG. 3. With this failure history database 21, an event code can be specified on the basis of an event or an alarm of a failure, and the failure unit is specified.

Here, the format of the failure history database 21 is not limited thereto, and variations for realizing efficient retrieval can be made. The correlating unit 13 may store one or a plurality of pieces of feature data indicating a failure event in the failure history database 21 in correlation with one event code.

The feature extracting unit 14 extracts a failure keyword included in event information as feature data of each event code correlated by the correlating unit 13. Here, the failure keyword extraction method is not limited, and a method which uses morpheme analysis proposed in Japanese Patent Application No. 2017-159990, for example, can be used. In this case, failure keywords may be determined by referring to various databases of unnecessary words excluded from extraction targets as well as synonyms (from a thesaurus) classified as having the same meaning.

FIG. 7 illustrates an example in which the failure history database 21 according to the present embodiment is sorted by an event code. In this manner, a plurality of pieces of event information and countermeasure parts are correlated with the same event code.

FIG. 8 is a diagram illustrating an example of the failure history database 21 based on feature data according to the present embodiment. A failure keyword is extracted by the feature extracting unit 14 from a description of an event correlated with an event code, and the failure keyword is stored in the failure history database 21 as feature data indicating the event. Here, the number assigned to a failure keyword and a countermeasure part in the drawing indicate the number of occurrences in a failure history having the same event code.

The retrieval receiving unit 15 receives a retrieval request for the failure history database 21 including a search keyword. The retrieval request may be realized by inputting one or a plurality of keywords and a sentence that describes an event observed by an operator may be input. In this case, the retrieval receiving unit 15 extracts feature data included in a description as a search keyword. Here, when the same method is used as a search keyword extraction method and a failure keyword extraction method, both keywords match each other and retrieval accuracy is improved.

The retrieval execution unit 16 retrieves the event information of the failure history database 21 on the basis of the search keyword and outputs an event code (a failure unit) correlated with the event information. The retrieval execution unit 16 may output an event message corresponding to the event code from the definition of the failure unit illustrated in FIG. 5. Weighting corresponding to the number of occurrences of the failure keyword may be applied to keyword matching during retrieval, for example.

FIG. 9 is a flowchart illustrating a retrieval process example of the failure classifying device 1 according to the present embodiment. In step S1, the retrieval receiving unit 15 receives the input of a sentence that describes an event that occurred in a machine as a retrieval request.

In step S2, the retrieval receiving unit 15 performs morpheme analysis on the sentence input as the retrieval request and extracts feature data as a search keyword.

In step S3, the retrieval execution unit 16 matches the search keyword to the failure keyword of the failure history database 21 to determine whether a failure history similar to the retrieval request is present. The flow proceeds to step S4 when a determination result of YES is obtained, and the process ends when a determination result of NO is obtained.

In step S4, the retrieval execution unit 16 extracts an event code assigned to the retrieved similar failure history.

In step S5, the retrieval execution unit 16 outputs the extracted event code and an event message corresponding to the event code.

According to the present embodiment, the failure classifying device 1 acquires a data set in which a failure unit and a constituent part are correlated and a failure history in which a failure event and a countermeasure part are correlated, and matches the constituent part to the countermeasure part to thereby correlate one or a plurality of pieces of event information with the failure unit. In this way, since the failure classifying device 1 can cluster failure events in failure units, it is possible to output failure units on the basis of an event and to specify the location of a mechanism unit which is the cause of the failure even when a controller of the machine does not generate an alarm. As a result, it is easy to specify failure locations and the time required for failure tracking is shortened.

Since the failure classifying device 1 extracts a failure keyword that characterizes the event information of failures for respective failure units, correlation between an event and a failure unit becomes clear, and it is possible to specify the causes of failures more reliably.

Additionally, since the failure classifying device 1 receives a retrieval request including a search keyword, it is possible to search the failure history database 21 to specify a failure unit and output a related message such as a countermeasure procedure. Since the failure classifying device 1 extracts feature data included in a retrieval request as a search keyword, it is possible to execute an efficient retrieval process based on keyword matching and to enhance the user's convenience and specify and output the causes of failures more reliably.

While embodiments of the present invention have been described above, the present invention is not limited to the above-described embodiments. Moreover, the advantageous effects described in the embodiments of the present invention are only exemplary ones of the most preferable effects produced by the present invention, and therefore, the advantageous effects of the present invention are not limited to those described in the embodiments of the present invention.

The failure classifying method by the failure classifying device 1 is realized by software. When the failure classifying method is realized by software, programs that form the software are installed on a computer (the failure classifying device 1). Moreover, these programs may be recorded on a removable medium and distributed to users and may be distributed by being downloaded to a computer of a user via a network.

EXPLANATION OF REFERENCE NUMERALS

1: Failure classifying device
10: Control unit
11: Failure history acquiring unit
12: Failure unit acquiring unit
13: Correlating unit
14: Feature extracting unit
15: Retrieval receiving unit
16: Retrieval execution unit
20: Storage unit
21: Failure history database

What is claimed is:

1. A failure classifying device comprising:
   a failure unit acquiring unit that acquires a data set in which a failure unit of a machine is correlated with one or a plurality of constituent parts;
   a failure history acquiring unit that acquires a failure history including events of failures that occurred in the past and countermeasure parts for eliminating the failures; and
   a correlating unit that stores information on one or a plurality of events in correlation with the failure unit by matching the constituent part to the countermeasure part.

2. The failure classifying device according to claim 1, further comprising:
a feature extracting unit that extracts a failure keyword included in the information on the event as feature data of each of the failure units correlated by the correlating unit, wherein
the correlating unit stores one or a plurality of pieces of the feature data in correlation with the failure unit.

3. The failure classifying device according to claim 1, further comprising:
a retrieval receiving unit that receives a retrieval request including a search keyword; and
a retrieval execution unit that retrieves information on the event on the basis of the search keyword and outputs the failure unit correlated with the information on the event.

4. The failure classifying device according to claim 3, wherein
the retrieval receiving unit extracts feature data included in the retrieval request as the search keyword.

5. A failure classifying method for causing a computer to execute:
a failure unit acquiring step of acquiring a data set in which a failure unit of a machine is correlated with one or a plurality of constituent parts;
a failure history acquiring step of acquiring a failure history including events of failures that occurred in the past and countermeasure parts for eliminating the failures; and
a correlating step of storing information on one or a plurality of events in correlation with the failure unit by matching the constituent part to the countermeasure part.

6. A non-transitory computer-readable medium having a failure classifying program recorded thereon, the failure classifying program causing a computer to execute:
a failure unit acquiring step of acquiring a data set in which a failure unit of a machine is correlated with one or a plurality of constituent parts;
a failure history acquiring step of acquiring a failure history including events of failures that occurred in the past and countermeasure parts for eliminating the failures; and
a correlating step of storing information on one or a plurality of events in correlation with the failure unit by matching the constituent part to the countermeasure part.

* * * * *